United States Patent
Scheuerpflug

[11] 3,779,581
[45] Dec. 18, 1973

[54] VEHICULAR SUSPENSION SYSTEM
[75] Inventor: Hans Scheuerpflug, Bad Mingolsheim, Germany
[73] Assignee: Firma Johannes Fuchs, Ditzingen, Baden-Wurttemberg, Germany
[22] Filed: Jan. 12, 1972
[21] Appl. No.: 217,139

[30] Foreign Application Priority Data
Jan. 14, 1971  Germany.................. P 21 01 504.3

[52] U.S. Cl.............................................. 280/95 R
[51] Int. Cl.............................................. B60p 1/18
[58] Field of Search ..................... 280/93–95, 96.2 B

[56] References Cited
UNITED STATES PATENTS
2,863,518   12/1958   Pellizzetti.......................... 280/95 R
2,828,969   4/1958    Hoffman........................... 280/95 R
3,251,433   5/1966    Hintze................................. 280/93

*Primary Examiner*—Edward A. Sroka
*Attorney*—Nichol M. Sandoe et al.

[57] ABSTRACT

The invention contemplates a vehicle suspension for selectively variable adjustment of track width and ground clearance, wherein the chassis frame is a hollow body containing longitudinally arrayed hydraulic-cylinder mechanism by which the wheels are suspended, the actuating connections to the wheel-positioning arms being by way of bell cranks.

13 Claims, 2 Drawing Figures

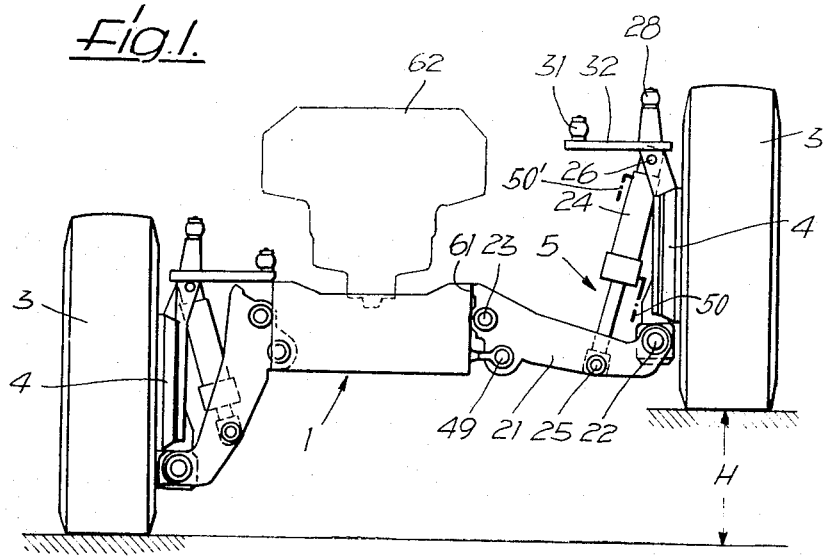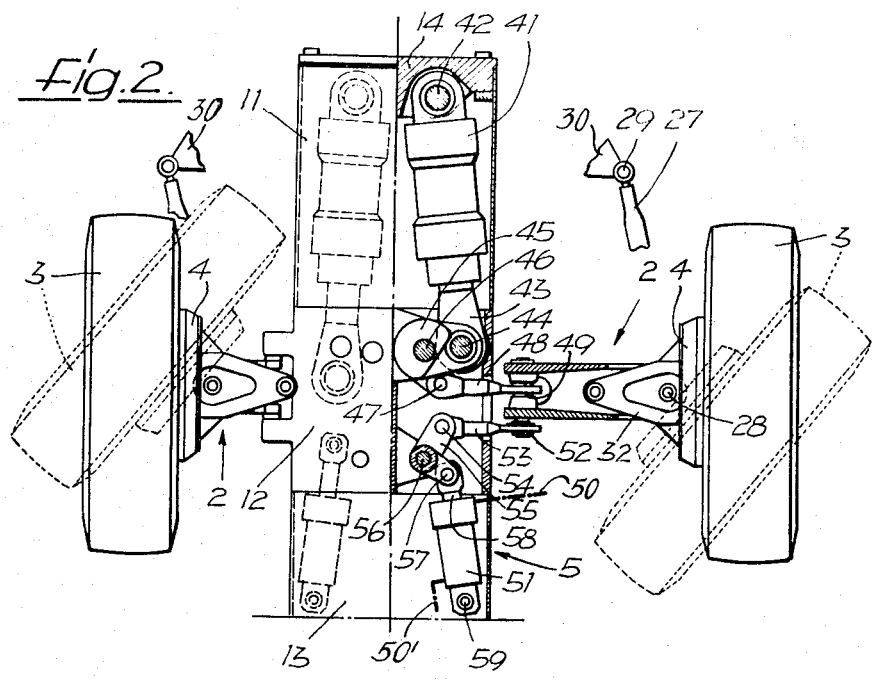

VEHICULAR SUSPENSION SYSTEM

The present invention relates to a vehicle having a chassis frame in the form of a hollow body, from which the wheels are suspended by means of swingable cross arms which can be displaced by hydraulic cylinders.

In traveling machines of this type, for instance in vehicular cranes, excavators and the like, which have, for instance, tires of size 16.00–25, wheel loads of about 15 to 20 tons occur during the operation of the crane. In order, despite these dimensions and loads, to be able to move these machines on public roads, the outside dimensions of the machines must comply with the regulations concerning the use of public highways. For this reason, the wheels of these traveling machines are adjustably positioned by hydraulic-cylinder mechanisms; for example, operation of such mechanisms can effect a widening of the track by about 850 mm, with an accompanying change in height of about 600 mm. This, however, requires very large hydraulic displacement cylinders. The arrangement of these displacement cylinders, however, presents great difficulties since as a result thereof the size of the machines, which is already very large, is still further increased by the hydraulic cylinders.

The object of the invention is to provide a traveling machine in which the size of the machine is not increased by the hydraulic cylinders necessary for the adjusted displacement of the wheels.

This objective is achieved in accordance with the invention by mounting the hydraulic cylinders in the hollow space of the chassis frame, and each of the cylinder mechanisms is operatively connected with the corresponding cross member or swing arm by a bell crank lever and a transversely extending rod. As a result, the hollow space conventionally surrounded by the chassis frame is utilized for mounting the hydraulic cylinders, so that the latter can be arranged on the machine without adding to outside clearance limitations. Another advantage is that the hydraulic cylinders are in this way arranged in a position in which they are also protected by the chassis frame, which is important in particular in the case of excavators and the like since an excessive amount of dirt on the hydraulic cylinders can impair their function.

The invention is described in detail in the following description of that portion of a chassis frame which serves the suspension of a pair of wheels in connection with drawings, in which:

FIG. 1 is a schematic, greatly simplified, front view of the chassis frame with the essential parts of the front-axle region of a vehicle, with the front wheels arranged at different heights; and FIG. 2 is a plan view, partially broken away and in section, of the front-axle region shown in FIG. 1.

The vehicle or traveling machine has a continuous elongated chassis frame 1, only the front part of which, serving the front-axle region of the vehicle, is shown in FIGS. 1 and 2. Two front wheels 3 together with their steering knuckles 4 are suspended from the chassis frame 1 by swinging-arm wheel suspensions 2 which are developed as mirror images with respect to the longitudinal axis of the frame. Each wheel suspension 2 is furthermore provided with camber-adjusting means 5.

The chassis frame 1 is developed as a hollow box beam and consists of a plurality of parts welded together, the front part 11 and the front supporting part 12 being shown in their entirety in FIG. 2, while the central part 13 adjoining the supporting part 12 has been shown only in part. The other parts of the chassis frame 1 which have not been shown may be of similar construction. The two individual wheel suspensions or arms 2 are pivotally suspended from the front supporting part 12, for which reason this part is preferably a steel casting, thus permitting wheel-suspension forces to be sustained within tolerable deformation limits. The connecting parts serving for the connection of the wheel suspension, such as, for instance, brackets for pivot pins, may be and preferably are integral formations of part 12. The front part 11 and the middle part 13 are made by the welding together of steel plate and are welded to the supporting part 12. The front part 11 is closed off at the front by a removable yoke 14, partially inserted into the front part 11 and bolted in place, as shown.

The wheel-suspension arms 2 of the front wheels 3 are developed as mirror images, with respect to the longitudinal center line of the chassis frame 1; for this reason, only the wheel suspension of one wheel will be described. The front wheel 3 is pivotally connected by means of a single transverse arm or member 21 with the supporting part 12 of the chassis frame 1, arm 21 being developed as a single piece and with a substantially U-shaped cross section. At its outer end, it is pivotally connected with the lower end of the steering knuckle 4, at a universal joint 22. A pivot axis of joint 22 is oriented horizontally, parallel to the center line of the chassis frame 1. At its inner end, the swing arm 21 is connected with the supporting part 12 by a fork joint 23, the pivot pin of which also extends parallel to the longitudinal center line of the chassis frame 1. The arm 21 thus in known manner forms a triangular wheel-positioning reference. For the further support of wheel 3 on arm 21, there is provided a camber-adjusting cylinder mechanism 24, one end of which is connected at 25 with arm 21 at a location between the two pivotal connections 22 and 23; at its other end, cylinder mechanism 24 is pivotally connected to the upper part of the steering knuckle 4 by a universal joint 26. The axis of rotation of the pin joint 25 and one of the pivot axes of the universal joint 26 are aligned parallel to the longitudinal center line of the chassis frame 1. To support and stabilize the upper part of the steering knuckle 4 (in the sense of the longitudinal direction of the vehicle), there is provided a longitudinal guide bar or radius rod 27, directed substantially parallel to the center line of the chassis frame; rod 27 is connected at one end by means of a ball joint 28 with the upper part of the steering knuckle 4, and at its other end by a ball joint 29 to a part of the chassis frame, suggested at 30. The second pivotal axes are in each case directed substantially vertically; they lie on a straight line which also passes through the center of the ball joint 28 and which thus represents the steering axis of the front wheel 3. For the transmission of steering forces there is provided parallel to the longitudinal guide bar 27 also a second longitudinal guide bar (not shown) which is connected at one end by a ball joint 31 to a steering lever 32 arranged on the steering knuckle 4 and at its other end in known manner to the vehicle-steering mechanism (not shown).

Wheel-reaction forces exert a rotational movement on the transverse arm 21, tending to turn it about the pivot axis of its fork joint 23. This moment of rotation is sustained on the supporting chassis part 12 by a hydraulic-cylinder mechanism 41 which is longitudinally oriented and mounted in the hollow space of the chassis frame 1. Mechanism 41 is connected at its cylinder end to the yoke 14 of the front part 11 of the chassis frame 1 by means of a pin joint 42. Its piston-rod end 43 is connected by a pin joint 44 with one arm of a bell-crank 45 which is supported by a pin joint 46 on the supporting part 12. The other arm of the bell crank 45 is connected by a conventional self-aligning joint 47 with a bar 48 which in its turn is connected, again by a pin joint 49, with the transverse swing arm 21. Bell-crank 45 serves to deflect in the generally longitudinal direction of the chassis frame 1 the force of the moment of rotation attributable to vehicle support via arm 21. In this way, it is possible to arrange the relatively large hydraulic cylinder 41 in longitudinal direction and to mount it in the hollow space of the chassis frame 1. This results in a very compact construction of the chassis. Furthermore, in this way, the top of the chassis frame 1 is available practically without limitation for the superstructure so that, for example, a V-type drive motor 62 can be mounted in the region of the front axle, as suggested by outline in FIG. 1.

The hydraulic cylinder 41, however, serves not only to sustain the wheel-reaction forces, but also as the actuating displacement cylinder for the arm 21 in order to swing the latter about the horizontal axis of its fork joint 23. In this way, the wheel 3 is adjusted in height and in track with respect to the chassis frame 1. On the other hand, the camber-adjusting means 5 assures that the wheel 3 at all times retains a substantially vertical position.

The hydraulically acting camber-adjusting means 5 comprises two hydraulic cylinders, namely a control cylinder 51 and the camber-adjusting cylinder 24. Both the control cylinder 51 and the camber-adjusting cylinder 24 are double-acting hydraulic cylinders with cylinder chambers of substantially equal volume. Hydraulic lines interconnect the cylinder chambers on the head or free-piston side on the one hand and, on the other hand, the tail sides, i.e., the cylinder chambers of the two hydraulic cylinders 24 and 51 surrounding the piston rods, as schematically suggested by the dashed lines 50—50', in both FIGS. 1 and 2. Such interconnection of cylinders assures complete displacement-tracking synchronism between the piston rod of the control cylinder 51 and the piston rod of the camber-adjusting cylinder 24. The swing arm 21 is connected with the piston rod 58 of the control cylinder 51, via a bell crank 55 which is supported by a pin joint 56 on the supporting part 12 of the chassis frame 1. One end of a rod 53 is connected by means of a conventional self-aligning joint 54 to an arm of bell crank 55, its other end being pinned at a joint 52 to the swing arm 21. The piston rod 58 of the control cylinder 51 is connected with the other arm of the bell crank 55 by means of a pin joint 57. The control cylinder 51 is connected at its end by a pin joint 59 to the center part 13 of the chassis frame 1. The adjusting force for the camber-adjusting cylinder 24, which is derived from the instantaneous angular swing of arm 21 is translated by the bell crank 55 into the longitudinal direction of the chassis frame 1. As a result, it is possible, as with the case of the wheel-displacement cylinder 41, to arrange the control cylinder 51 in the generally longitudinal direction and mount it in the hollow space of the chassis frame 1.

It will be understood that the vehicle may have a rear-axle suspension (not shown in the drawings) of substantially the same construction as the front-axle suspension described above. Should it be desired that the rear-axle region be non-steerable, the control ball-joints 31 may be positioned by fixed radius-rod connections to suitable ball-joint points on the vehicle frame. And should it be desired that the rear-axle region be optionally steerable and non-steerable, the same rods as used for coordinated steering actuation at ball joints 31 may be of the disconnectable variety, being optionally connectable (a) to frame-mounted ball joints which are located to maintain the straight-steering orientation of steering arms 32, or (b) to the vehicle-steering mechanism already described.

The manner of operation of the wheel suspension 2 shown in the drawing and the possibilities of the displacement thereof will be evident from the above description. By means of the displacement cylinder 41, the swing arm 21 can be displaced between the downward directed position shown on the lefthand side of FIG. 1 and the approximately horizontally aligned position shown on the righthand side of FIG. 1. When the wheel 3 is in its lowest position with respect to the chassis frame, the smallest track (and greatest ground clearance) is established, such as must be maintained, for instance, for travel of the machine on a public highway. When the wheel 3 is in its highest position, the maximum track width is established; in this case, the overall center of gravity of the machine lies very low and the ground-reaction points of the wheels have their greatest lateral spread, which is particularly advantageous in the case of a machine equipped with a crane. In order to relieve the displacement cylinder 41 in this specific operating position, the swing arm 21 may be provided with an abutment or stop 61 which, in the upwardly swung position of the arm 21, rests on an abutted supporting part 12 of the chassis frame 1.

When working on uneven terrain, the vehicle machine can be adjusted horizontally within certain limits by displacing the displacement cylinders 41 associated with the individual wheels 3 in accordance with the specific height of the ground, as can be noted by way of example from FIG. 1. The height difference H shown therein is about 600 mm, for the above-stated dimensional situation; similarly, the change in track width amounts to about 850 mm, for the swing-arm adjustment on each side of the chassis.

If elastic members, such as, for instance, hydropneumatic pressure accumulators, are connected into the pressure fluid feedline extending to the displacement cylinders 41, one obtains in simple fashion a hydropneumatic suspension of the machine, for instance for highway travel. If the resilience of the chassis is undesirable upon the uses of the machine, it is merely necessary to disconnect the elastic members.

The control cylinder 51 and its corresponding camber-adjustment cylinder 24 are, as described above, generally so designed that synchronism is obtained between the displacement of the swing arm 21 and change in the adjustment of the camber of the wheel 3, so that the vertical axis of the wheel 3 remains substantially parallel to the mid-vertical of the chassis frame 1. In case of need, however, control members can also be inserted in the connecting lines between these two hydraulic cylinders, so that it is possible to eliminate the synchronism between the camber adjustment cylinder 24 and its corresponding control cylinder 51 and adapt the adjustment of the camber of the corresponding wheel 3 to special circumstances.

The large displacement cylinders 41 are arranged in the hollow chassis frame 1 well protected against dirt and damage. If nevertheless an overhaul of these cylinders should become necessary, they can be removed without difficulty from the chassis frame 1 by loosening the yoke 14 and removing the pins 42–44. Since cylinders 41 are arranged entirely at the front end of the hollow space of the chassis frame 1, a fork-lift truck ideally lends itself to this maintenance manipulation.

What is claimed is:

1. A vehicle-suspension system, including an elongated hollow chassis member, a pair of outwardly extending wheel-supporting swing arms pivotally carried on horizontal pivot axes at one longitudinal location on said member, separate actuating hydraulic-cylinder mechanisms for said arms and mounted within said chassis member, and means including bell cranks pivoted to said chassis member and establishing separate actuating connections between each hydraulic-cylinder mechanism and its corresponding swing arm.

2. The system of claim 1, in which the outer end of each said swing arm includes horizontally pivoted adjustable-camber wheel-supporting means, and in which for each swing arm there is a first hydraulic cylinder mechanism contained within said chassis member for position adjustment of the swing arm for wheel elevation with respect to the chassis member, and wheel-camber adjustment mechanism including a second hydraulic cylinder mechanism for each swing arm and also contained within said chassis member, each of said first and second mechanisms having independent bell-crank connection to said arm.

3. The system of claim 1, in which said hydraulic-cylinder mechanisms are longitudinally arrayed with respect to the elongation of the hollow chassis member.

4. A vehicle-suspension system, including an elongated hollow chassis member; a pair of outwardly extending wheel-supporting swing arms pivotally carried at opposed location on said member; separate actuating hydraulic-cylinder mechanisms for said arms and mounted within said chassis member, said mechanisms for each swing arm comprising a first hydraulic cylinder mechanism for position adjustment of the swing arm for wheel elevation with respect to the chassis member, and a second hydraulic cylinder mechanism for wheel-camber adjustment and connected to the swing arm; means including bell cranks pivoted to said chassis member and establishing separate actuating connections between each hydraulic-cylinder mechanism and its corresponding swing arm; a wheel-mounting element connected on a horizontal pivot axis to the outer end of each swing arm; a third hydraulic-cylinder mechanism connecting each swing arm to the associated wheel-mounting element at points offset from said pivot axis; and hydraulic connection lines between said second cylinder and said third cylinder for causing operation of said third cylinder to track operation of said second cylinder.

5. The system of claim 4, in which the volumetric displacements of said second cylinder and of said third cylinder are substantially the same.

6. A vehicle-suspension system, comprising a generally central elongated frame, a swing arm pivoted to said frame on a generally horizontal and longitudinally extending axis, an upstanding wheel-supporting member having at its lower end a pivot-joint connection to the outer end of said arm, said connection being also about a generally horizontal and longitudinally extending axis, a first hydraulic cylinder mechanism mounted on said frame and extending longitudinally thereof, means including a frame-pivoted bell crank connecting said mechanism to said arm for elevating the same, a second hydraulic cylinder mechanism mounted on said frame and connected to track the instantaneous actuated position of said arm and first mechanism, means including a third hydraulic cylinder mechanism pivotally connected between an upper part of said wheel-supporting member and a point on said arm offset from said pivot-joint connection, and hydraulic connection lines between said second and third cylinders for causing operation of said third cylinder to track operation of said second cylinder in the direction to maintain substantially erect wheel-positioning orientation of said member over a range of swing-arm pivoted displacement.

7. A vehicle-suspension system according to claim 6, wherein said member is part of a steering-knuckle mechanism having an upstanding wheel-steering axis, and longitudinally extending tie-rod means connecting a point on said steering axis and on the upper part of said member to a part of said frame.

8. A vehicle-suspension system according to claim 7, wherein said member is part of a steering-knuckle mechanism having an upstanding wheel-steering axis, and wherein said pivot-joint connection is a universal joint, one pivot axis of which is on said generally horizontal and longitudinally extending axis thereof, and the other pivot axis of which is substantially horizontal and extends substantially perpendicular to the instantaneous vertical plane of said tie-rod means.

9. A vehicle-suspension system according to claim 8 wherein said universal joint pivot axes substantially intersect said wheel-steering axis.

10. A vehicle-suspension system according to claim 8, wherein a second universal joint connects said third hydraulic cylinder mechanism to the upper part of said member, the pivot axes of said second universal joint being substantially parallel to the respective pivot axes of said first-mentioned universal joint.

11. A vehicle-suspension system according to claim 10, wherein said universal joint pivot axes substantially intersect said wheel-steering axis.

12. A vehicle-suspension system, including an elongate longitudinally extending hollow chassis member, a pair of oppositely outwardly extending wheel-supporting swing arms pivotally carried at one longitudinal location on said member, separate actuating hydraulic-cylinder mechanisms mounted within said chassis member and longitudinally offset from said one location, and means including bell cranks pivoted to and within said chassis member at substantially said one location and establishing within said chassis member separate actuating connections between each hydraulic-cylinder mechanism and its corresponding swing arm, whereby pivot-bearing forces for said swing arms and for said bell cranks are clustered in and near said one location, and whereby hydraulic-cylinder mechanisms and their respective movements are contained within said chassis member.

13. A vehicle-suspension system including an elongate longitudinally extending hollow chassis member, a pair of oppositely outwardly extending wheel-supporting swing arms pivotally carried at one longitudinal location on said member, the wheel-supporting ends of said arms including steerable wheel-supporting means, separate actuating hydraulic-cylinder mechanisms mounted within said chassis member, and means including bell cranks pivoted to said chassis member and establishing separate actuating connections between each hydraulic-cylinder mechanism and its corresponding swing arm, said mechanisms being longitudinally arrayed with respect to the elongated of the chassis member, whereby the overall width of said chassis member may be relatively small, so that a relatively great range of swing-arm movement and wheel-steering movement may be accommodated.

* * * * *